No. 666,039. Patented Jan. 15, 1901.
J. E. THORNTON.
MAGAZINE FILM HOLDER.
(Application filed Sept. 26, 1898.)
(No Model.) 2 Sheets—Sheet 1.
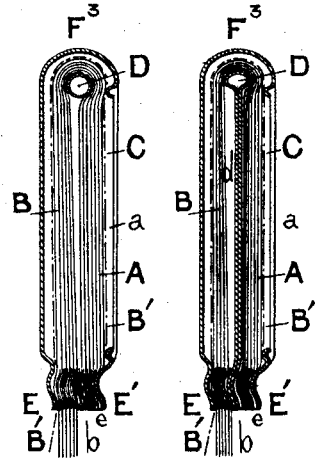
FIG. 12. FIG. 11.
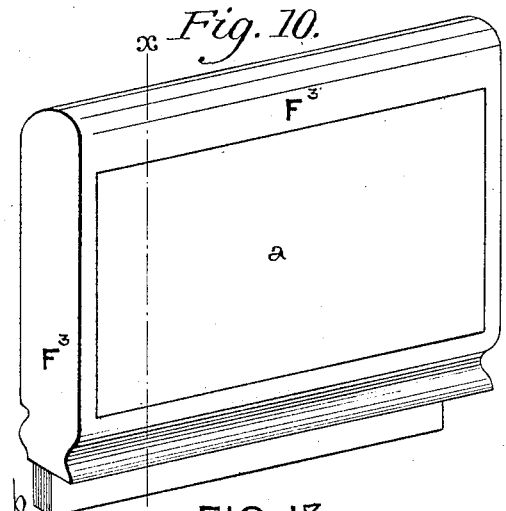
FIG. 13.
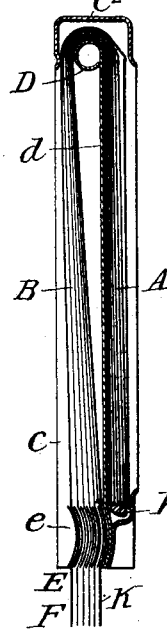
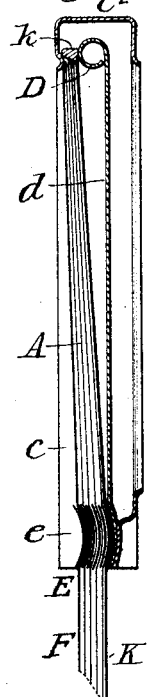
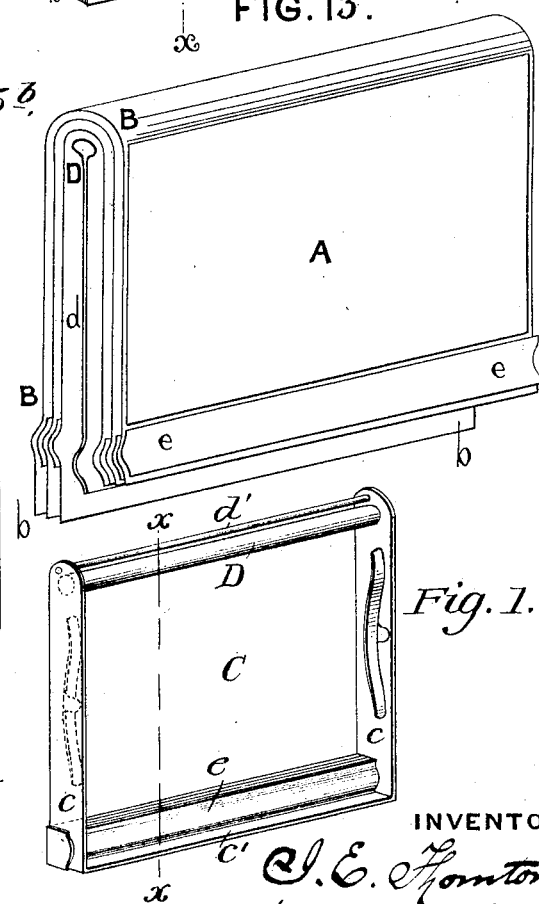
WITNESSES.
Joseph Bates.
E. Howard
INVENTOR
J. E. Thornton
by O. Owain O'Brien
Atty No. 666,039. Patented Jan. 15, 1901.
J. E. THORNTON.
MAGAZINE FILM HOLDER.
(Application filed Sept. 26, 1898.)
(No Model.) 2 Sheets—Sheet 2.
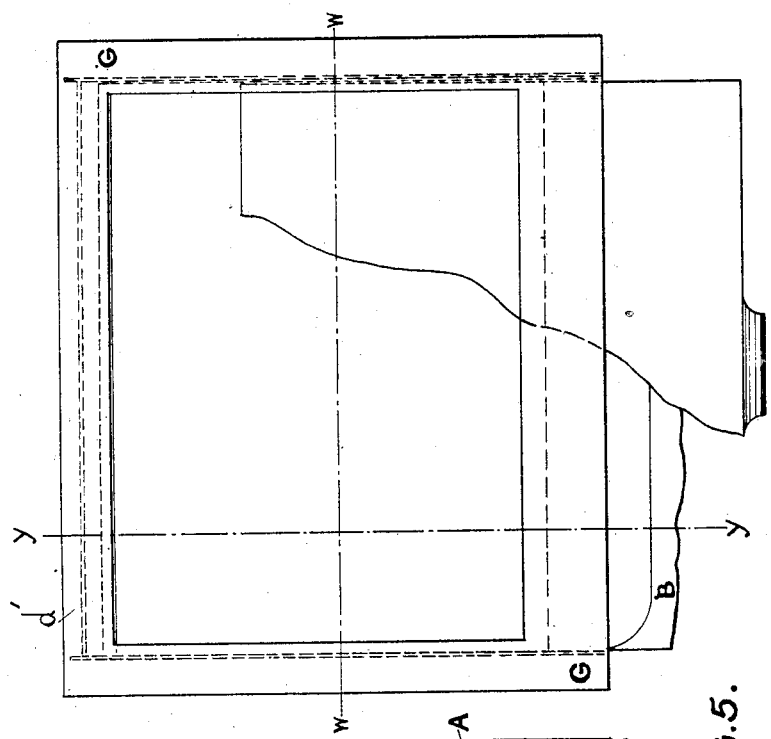
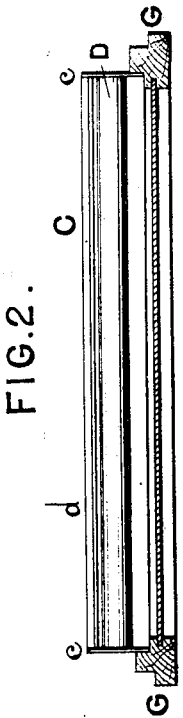
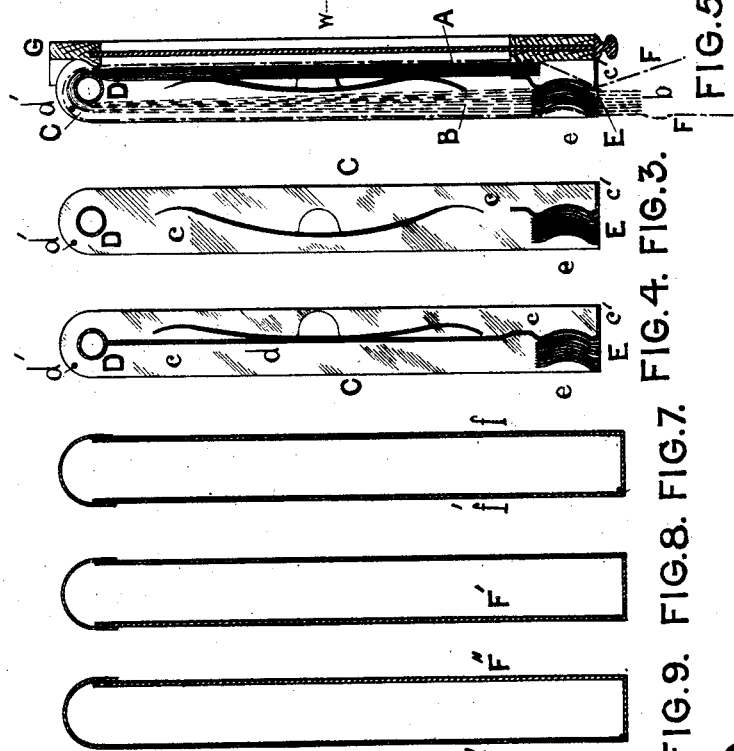
WITNESSES.
INVENTOR

UNITED STATES PATENT OFFICE.

JOHN E. THORNTON, OF ALTRINGHAM, ENGLAND.

MAGAZINE FILM-HOLDER.

SPECIFICATION forming part of Letters Patent No. 666,039, dated January 15, 1901.

Application filed September 26, 1898. Serial No. 691,950. (No model.)

*To all whom it may concern:*

Be it known that I, JOHN EDWARD THORNTON, of Altringham, in the county of Chester, England, have invented certain new and useful Improvements in Cases for Containing Flat Sensitive Films, of which the following is a specification.

This invention deals with an improved method of storing and using flat sensitive photographic films.

Hitherto in dealing with flat films in separate sheets it has been necessary (in a dark room or like convenience) to remove the sensitive films from the case or envelop in which they have been packed and place them in a changing box or holder fitted to the camera or in a camera specially designed and made for the purpose in order to use or expose them, as desired, and when the films thus loaded into the camera have been used recourse must be had to a dark room or like convenience to remove and recharge.

My invention consists of a sealed packet of flat films comprising a frame or structure on which the flat films are mounted as a pack, with a guide-piece, over which the films can be drawn, and a number of light-tight apertures at the opposite end formed of separate strips, through which an opaque backing-sheet can be drawn, an opaque envelop or covering to protect the films from light, and a number of flat films, each provided with an opaque backing, packed therein by the manufacturer for sale and storage and so arranged that they can be successively exposed, the said frame and packet being of a size and shape to fit direct into a camera or into an adapter or holder without removing the films packed therein. Thus as a new article of manufacture a light-tight cheap packet containing films is provided by this invention, and such packet may be stored, loaded into and used, and removed from the camera all in daylight and the films retained there until required for development, and the case cannot be conveniently refilled, but will be discarded and useless after the films have been subsequently removed therefrom.

The invention will be fully described with reference to the accompanying drawings.

Figure 1 is a perspective view of the frame in which the pack of films is mounted; Fig. 2, a front elevation of sealed pack in position in holder; Fig. 3, a transverse section on line $xx$, Fig. 1; Fig. 4, a transverse section showing a modification; Fig. 5, a transverse section on line $yy$, Fig. 2, showing pack of films in holder; Fig. $5^a$, a transverse section showing a modified arrangement; Fig. $5^b$, a transverse section of same, showing the second flexible sheet in another position; Fig. 6, a longitudinal section on line $ww$, Fig. 2; Fig. 7, a transverse section of one form of envelop or cover; Fig. 8, a transverse section of another form of envelop or cover; Fig. 9, a transverse section showing another form of same; Fig. 10, a perspective view of another modification; Fig. 11, a transverse section on line $xx$, Fig. 10; Fig. 12, a transverse section of same without diaphragm; Fig. 13, a perspective diagram showing arrangement of flat films and opaque backing in Figs. 10 and 11.

The flat films A are each attached or secured to a sheet or backing B of opaque material, such as black paper, to prevent the light penetrating from one to the next, and the backing B is formed with an extension piece or tag $b$, which projects to provide a means for manipulating the film.

The flat films A, with their opaque backings B, are mounted upon a frame C, on which they are held flat and straight in position for exposure. The frame C is constructed with two flanges $c$, one on either side, and a bar or guide-piece D near one end, around which the extension-pieces $b$ and films attached are successively drawn each after exposure from the front to the back. At the other end the flanges $c$ are joined by an end piece $c'$, included in the construction of which are a number of suitably-shaped strips $e$, placed side by side and separated from each other by distance-pieces, so as to form altogether a number of narrow light-tight openings E, one of such openings being provided for each opaque backing extension or tag $b$, which may be necessary to complete the packet.

If desired, a diaphragm $d$, Fig. 4, may be secured between the guide-pieces D, flanges $c$ and end piece $c'$, and one side of such diaphragm may be turned around to form the guide-piece D.

The flanges $c$ may be formed in one piece, and in such case they are connected together at the end of the frame remote from the light-tight apertures and beyond and clear of the guide-piece D.

The pack composed of the flat films A and opaque backing when mounted in position on the frame C is inclosed in an opaque envelop or covering, which may fit between the flanges c and which may be made of black opaque paper, (several sheets, if necessary,) thin sheet metal, or other suitable material. The envelop or cover, as shown in Fig. 5, comprises a sheet of opaque paper F, (the part protecting the films having two extra sheets attached to it,) passed over the front of the films A, around the guide-piece D, and through one of the light-tight apertures E. Upon the projecting end being pulled the opaque cover is withdrawn from the face of the films. This is only done when the packet is in the camera. The envelop or cover is drawn to the back of the case and the films as they are exposed are drawn around into a like position behind it, so that when all the films have been exposed they are in their new positions still covered and protected from the light by the said opaque envelop.

The extension-pieces b of the backing-sheets B are placed behind the strips e, during the constructing of the case, one being laid in position and then the other.

In the modification in Figs. 5$^a$ and 5$^b$ the case is made with a top piece c$^2$, extending across from the flanges c, and a second flexible opaque sheet K is placed behind the pack of films. This is provided at the end with a roll or enlargement k. This opaque sheet K is drawn over the guide-piece D after the last flat film has been exposed and drawn over the enlargement k, closing the passage around guide-piece D through which the films have passed, making it light-tight.

In the modifications shown in Figs. 7, 8, and 9 the cover or envelop is made of thin sheet-tin or other metal. In Fig. 7 it is made in two parts, one, f, at the front and the other, f', at the back of the frame C, either of which can be removed as required. In Fig. 8 it is made of one piece F', of tin or other metal, which can be withdrawn from the frame C, and in Fig. 9 it is made of sheet metal or other material in two parts, the back part f$^2$ of which will be secured to the frame C, and the front part F$^2$ can be withdrawn from the pack when required.

A holder or adapter G is provided which fits the camera and into which the sealed packet of films is inserted for use in the camera, or the sealed packet may be made to fit direct into the camera.

In the modifications Figs. 10 to 13 the cover F$^3$ to inclose the pack of flat films and opaque sheets is stamped or pressed out of sheet metal, cardboard, or other similar light inexpensive material and of a size and shape to fit direct into the camera. It is divided into two compartments by the diaphragm d and provided with an exposing-aperture a at the front, through which the films A, placed therein, are, when required, successively exposed. At or near the top of the frame C is fitted the bar D, over which the flat films, with their opaque backing B, can be drawn from one compartment to the other after exposure to uncover another film, so that it is ready for exposure. In the lower edge of the frame C are formed the light-tight apertures E, of corrugated form, through which are inserted the ends or an extension b of the opaque backing material B. In addition to the apertures E there are toward the front of the case a number of similar apertures E', into which the ends of the flat films are placed when being packed and by which they are held extended and perfectly flat until they are drawn away after exposure. An additional opaque sheet B' is placed in front of the films to cover the exposing-aperture a.

The opaque sheet B' may, if found desirable, be thicker than the intermediate opaque sheets B—that is, may consist of several sheets superimposed—to make the pack perfectly light-proof at the outside. The flat films are secured at one edge to the opaque sheets B, and each opaque sheet B extends at the back of the flat film over the bar D to the withdrawal slit E to provide means for manipulating the flat film without withdrawing it from the case. A sealed packet of flexible sensitive films so arranged and packed in a cheap packing-case is thus issued by the makers, kept stored until required, and used and changed in the camera in daylight and afterward stored until required for development all without access of light before or after exposure and also without danger of light injuring the films behind during the exposure of the front one.

What I claim as my invention, and desire to protect by Letters Patent, is—

1. A light-tight case to contain a pack of flat sensitive films, comprising in its construction, a guide-piece D placed at one end around which the films can be drawn to a fresh position, a number of separate corrugated strips of material e placed at the opposite end, of suitable shape and stiffness and held at a suitable distance apart to form a number of narrow light-tight openings E, a movable envelop to protect the faces of the flat films and a frame to connect and support these parts, substantially as described.

2. A light-tight case to contain a pack of flat sensitive films comprising in its construction a guide-piece D placed at one end around which the films can be drawn to a fresh position, a number of separate corrugated strips of material e placed at the opposite end, of suitable shape and stiffness and held at a suitable distance apart to form a number of narrow light-tight openings E, a flexible envelop F of opaque material stretched over the films and backing, substantially as described.

3. In a light-tight case to contain a pack of flat sensitive films the combination with a guide-piece D placed at one end around which the films can be drawn to a fresh position, of a number of separate corrugated strips of material e placed at the opposite end, of suitable shape and stiffness and held at a suitable distance apart to form a number of narrow light-tight openings E, and an envelop protecting both front and back of the packet, substantially as described.

4. In a sealed packet of flat photographic films the combination with the flat sensitive films A and opaque backings B of a frame C upon which the films are mounted, the guide-piece D over which the films and backing are drawn from back to front the corrugated strips e forming light-tight apertures E through which the extended ends of the backing B are passed and the envelop to protect the films from light, substantially as described.

5. In a sealed packet of photographic films the combination with a pack of flat films A and opaque backing B, a frame C upon which the films are mounted, and guide-piece D over which the films and backing are drawn from front to back, of a number of corrugated strips e forming a number of light-tight openings E through which the extension b of the backing B is drawn, a flexible opaque envelop F to protect the films, substantially as described.

In witness whereof I have hereunto signed my name in the presence of two subscribing witnesses.

J. E. THORNTON.

Witnesses:
 J. OWDEN O'BRIEN,
 J. P. LEA.